United States Patent
Zhang et al.

(10) Patent No.: US 10,822,001 B2
(45) Date of Patent: Nov. 3, 2020

(54) RAIL VEHICLE LIGHTING DEVICE

(71) Applicant: CRRC Qingdao Sifang Co., Ltd., Shandong (CN)

(72) Inventors: Haiyan Zhang, Shandong (CN); Yongxu Li, Shandong (CN); Long Zhao, Shandong (CN); Xueliang Wang, Shandong (CN); Keshu Zhang, Shandong (CN); Zhiguo Li, Shandong (CN)

(73) Assignee: CRRC Qingdao Sifang Co., Ltd., Shandong (CN)

( * ) Notice: Subject to any disclaimer, the term of this patent is extended or adjusted under 35 U.S.C. 154(b) by 20 days.

(21) Appl. No.: 16/063,151

(22) PCT Filed: Dec. 5, 2016

(86) PCT No.: PCT/CN2016/108576
§ 371 (c)(1),
(2) Date: Jun. 15, 2018

(87) PCT Pub. No.: WO2017/101695
PCT Pub. Date: Jun. 22, 2017

(65) Prior Publication Data
US 2019/0126818 A1    May 2, 2019

(30) Foreign Application Priority Data

Dec. 15, 2015 (CN) .......................... 2015 1 0938184
Dec. 15, 2015 (CN) .......................... 2015 1 0938301
Dec. 15, 2015 (CN) ..................... 2015 2 1045599 U (51) Int. Cl.
*B60Q 1/00* (2006.01)
*B61D 29/00* (2006.01)
(Continued)

(52) U.S. Cl.
CPC ............... *B61D 29/00* (2013.01); *B60Q 3/43* (2017.02); *F21S 2/005* (2013.01); *F21S 4/22* (2016.01);
(Continued)

(58) Field of Classification Search
CPC ... B60Q 3/43; B60Q 3/46; B60Q 3/78; B60Q 2500/10; B60Q 3/51; B60Q 1/32;
(Continued)

(56) References Cited

U.S. PATENT DOCUMENTS 6,179,452 B1 * 1/2001 Dunning .................. F21S 4/20
362/470
6,802,634 B1 10/2004 Pan
(Continued)

FOREIGN PATENT DOCUMENTS

| CN | 101832525 A | 9/2010 |
| CN | 101968176 A | 2/2011 |

(Continued)

OTHER PUBLICATIONS

International Search Report from International Application No. PCT/CN2016/108576, dated Mar. 9, 2017, 8 pages with English translation.
(Continued)

*Primary Examiner* — William J Carter
*Assistant Examiner* — Omar Rojas Cadima
(74) *Attorney, Agent, or Firm* — TraskBritt (57) ABSTRACT

A rail vehicle lighting device includes: a plurality of short lighting fixtures assembled into a long lighting fixture having a shape matching with a shape of an irregular interior decoration. Each of the short lighting fixtures is provided with a section body. A light source is provided on the section body. The section body is twisted such that included angles between each of the light sources and a horizontal plane are
(Continued)

consistent. In the rail vehicle lighting device, the plurality of short lighting fixtures is assembled into the long lighting fixture having the shape matching with the shape of the irregular interior decoration, thereby satisfying a requirement on a shape of a lighting fixture. By arranging the twisted section body, respective points of the long lighting fixture have consistent light source illumination angles, thereby achieving a satisfactory illumination effect inside a carriage having an irregular interior decoration, and accordingly improving the appearance of the carriage.

14 Claims, 8 Drawing Sheets (51) Int. Cl.
*F21S 2/00* (2016.01)
*F21S 4/22* (2016.01)
*F21S 4/26* (2016.01)
*F21V 21/00* (2006.01)
*B60Q 3/43* (2017.01)
*F21V 15/01* (2006.01)
*F21V 17/18* (2006.01)
*F21V 23/00* (2015.01)
*F21V 23/02* (2006.01)
*F21Y 115/10* (2016.01)
*F21W 107/10* (2018.01)
*F21W 121/00* (2006.01)

(52) U.S. Cl.
CPC ............. *F21S 4/26* (2016.01); *F21V 15/01* (2013.01); *F21V 17/18* (2013.01); *F21V 21/00* (2013.01); *F21V 23/001* (2013.01); *F21V 23/02* (2013.01); *F21W 2107/10* (2018.01); *F21W 2121/00* (2013.01); *F21Y 2115/10* (2016.08)

(58) Field of Classification Search
CPC ........ B60Q 3/53; B60Q 3/54; B64D 2203/00; F21Y 2103/00; G02B 6/0021; F21S 4/20; F21W 2106/00; B61D 29/00
USPC .......................... 362/493, 495, 487, 471, 478
See application file for complete search history.

(56) References Cited

U.S. PATENT DOCUMENTS

| | | | |
|---|---|---|---|
| 7,303,320 B1* | 12/2007 | Ashley | B60Q 1/0483 248/121 |
| 8,425,075 B1 | 4/2013 | Falat et al. | |
| 9,340,287 B2* | 5/2016 | Umlauft | B64D 11/00 |
| 2002/0126481 A1 | 9/2002 | Pan | |
| 2004/0135522 A1* | 7/2004 | Berman | H05B 45/40 315/291 |
| 2008/0080203 A1* | 4/2008 | Neufeglise | B60Q 1/302 362/540 |
| 2010/0019689 A1 | 1/2010 | Shan | |
| 2015/0151679 A1* | 6/2015 | Aruga | B64D 47/02 362/470 |
| 2017/0029112 A1* | 2/2017 | O'Kell | B64D 11/00 |

FOREIGN PATENT DOCUMENTS

| | | |
|---|---|---|
| CN | 201983157 U | 9/2011 |
| CN | 203404686 U | 1/2014 |
| CN | 103672439 A | 3/2014 |
| CN | 103697390 A | 4/2014 |
| CN | 203823524 U | 9/2014 |
| CN | 104776328 A | 7/2015 |
| CN | 204573828 U | 8/2015 |
| CN | 105402676 A | 3/2016 |
| CN | 105402677 A | 3/2016 |
| CN | 205261395 U | 5/2016 |
| CN | 205261396 U | 5/2016 |
| CN | 205261397 U | 5/2016 |
| CN | 205261398 U | 5/2016 |
| CN | 205316193 U | 6/2016 |
| DE | 102006018298 A1 | 10/2007 |
| DE | 102012220090 A1 | 5/2014 |
| EP | 1357331 A2 | 10/2003 |
| EP | 2495150 A2 | 9/2012 |
| FR | 2951849 A1 | 4/2011 |
| GB | 2496189 A | 5/2013 |
| JP | 2010244953 A | 10/2010 |

OTHER PUBLICATIONS

International Written Opinion from International Application No. PCT/CN2016/108576, dated Mar. 9, 2017, 4 pages.
Extended European Search Report for Application No. 16874752.5 dated Sep. 17, 2018, 7 pages.

* cited by examiner

RAIL VEHICLE LIGHTING DEVICE

CROSS-REFERENCE TO RELATED APPLICATIONS

This application is a national phase entry under 35 U.S.C. § 371 of International Patent Application PCT/CN2016/108576, filed Dec. 5, 2016, designating the United States of America and published as International Patent Publication WO 2017/101695 A1 on Jun. 22, 2017, which claims the benefit under Article 8 of the Patent Cooperation Treaty to Chinese Patent Application Serial Nos. 201510938301.3, 201510938184.0, and 201521045599.7, all filed on Dec. 15, 2015, the disclosure of each of which is hereby incorporated herein in its entirety by this reference.

TECHNICAL FIELD

Embodiments of the present disclosure relate to a lighting device, in particular a rail vehicle lighting device.

BACKGROUND

With the development of passenger vehicles, people not only raise their requirement for vehicle speed, but also raise their requirement for seating comfort and appearance inside the vehicle. At present, an irregular interior decoration, e.g., a wavy interior decoration is adopted in carriages of many vehicles to improve the appearance of the carriage. However, LED and fluorescent lamps adopted on lighting devices of conventional carriages both illuminate as a light source based on a line, a plane or a point, and cannot achieve a good illumination effect to a novel structure of a wavy interior decoration.

BRIEF SUMMARY

An objective of embodiments of the present disclosure lies in solving the problem of how to satisfy the lighting requirement regarding the structure of the irregular interior decoration, and providing a rail vehicle lighting device.

To achieve the above objective, embodiments of the present disclosure present the following technical solution:

a rail vehicle lighting device, comprising a plurality of short lighting fixtures that are assembled into a long lighting fixture having a shape matching with a shape of the irregular interior decoration;

wherein each of the short lighting fixtures is provided with a section body, a light source is provided on the section body, the lighting fixture includes a plurality of light sources, and the section body is twisted such that included angles between each of the light sources and a horizontal plane are consistent.

Further, the irregular interior decoration is in an up and down as well as front and back wavy shape.

Further, each of the short lighting fixtures includes a housing comprising a lamp body and a lampshade, wherein the section body is provided in the housing.

Further, each of the short lighting fixtures is fixed with an L-shaped mounting sheet through a mounting clasp seat, and the L-shaped mounting sheet is fixed with the irregular interior decoration.

Further, a gasket is provided between the L-shaped mounting sheet and the irregular interior decoration, and a thickness of the gasket is adjusted, such that the distances between each of the light sources and a top plate of a vehicle body are the same.

Further, two light sources with different illumination angles are provided on the section body, one light source irradiates toward the top plane of the vehicle body, and the other light source irradiates toward the inside of a carriage.

Further, each of the short lighting fixtures is provided with a wiring groove.

Further, each of the short lighting fixtures and a power supply are fixed and integrated together.

Further, the short lighting fixtures are linked with each other via terminals.

In summary, in the rail vehicle lighting device of embodiments of the present disclosure, a plurality of short lighting fixtures is assembled into the long lighting fixture having the shape matching with the shape of the irregular interior decoration, not only satisfying a requirement on a shape of a lighting fixture, but also helping with heat dissipation of the lighting fixture. By arranging the twisted section body, respective points of the long lighting fixture have consistent light source illumination angles, thereby achieving a satisfactory illumination effect inside a carriage having an irregular interior decoration, and accordingly improving the appearance of the carriage.

BRIEF DESCRIPTION OF THE DRAWINGS

For a better understanding of the present disclosure, accompanying drawings described hereinafter are provided to constitute one part of the application; the schematic embodiments of the present disclosure and the description thereof are used to illustrate the present disclosure but not to limit the present disclosure improperly. In the accompanying drawings.

The above drawings include the following reference signs:

1, wavy interior decoration; 2, top plate of the vehicle body; 3, short lighting fixture; 4, long lighting fixture; 5, section body; 6, lamp body; 7, lampshade; 8, light source mounting base; 9, lampshade buckle; 10, mounting clasp seat buckle; 11, power supply; 12, light source; 13, mounting clasp seat; 14, L-shaped mounting sheet; 15, gasket; 16, lamp tube portion; 17, lamp body portion; 18, V-shaped base plate; 19, lampshade mounting base; 20, wiring groove; 21, mounting plate; 22, lamp tube section; 23, terminal; 24, power supply.

DETAILED DESCRIPTION

Embodiments of the present disclosure will be described below with reference to the drawings and in combination with embodiments.

The First Embodiment

The rail vehicle lighting device, according to an embodiment of the present disclosure, is mainly for illumination of the carriage having an irregular interior decoration, the irregular interior decoration in this embodiment is a wavy interior decoration having ups and downs in both a horizontal direction and vertical direction, and the rail vehicle lighting device according to the embodiment of the present disclosure is provided between the wavy interior decoration and the top plate of the vehicle body.

As shown in FIGS. 1 to 5, the rail vehicle lighting device includes a plurality of short lighting fixtures 3, wherein the short lighting fixtures 3 are assembled into a long lighting fixture 4 according to the shape of the wavy interior decoration 1, and the long lighting fixture 4 has a shape matching with the shape of the wavy interior decoration 1. This assembly not only satisfies a requirement on a shape of a lighting fixture, but also helps with heat dissipation of the lighting fixture.

Each of the short lighting fixtures 3 includes a housing comprising a lamp body 6 and a lampshade 7 and a section body 5 provided inside the housing.

Figure 1:
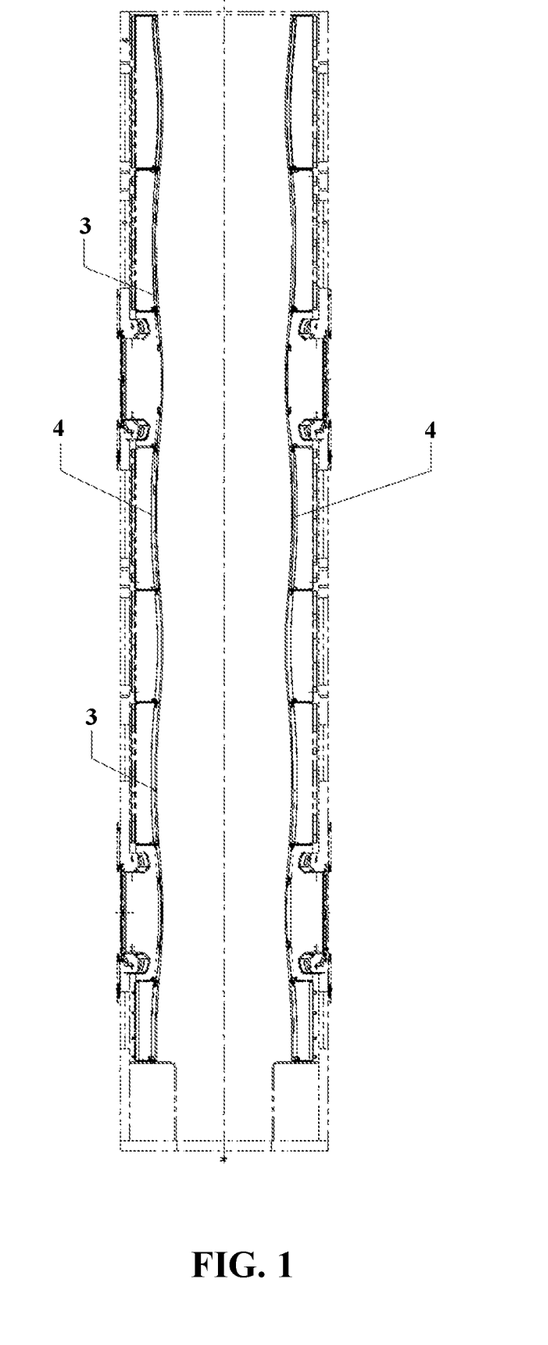
FIG. 1 illustrates a structure of the rail vehicle lighting device provided in an embodiment of the present disclosure.
Figure 2:
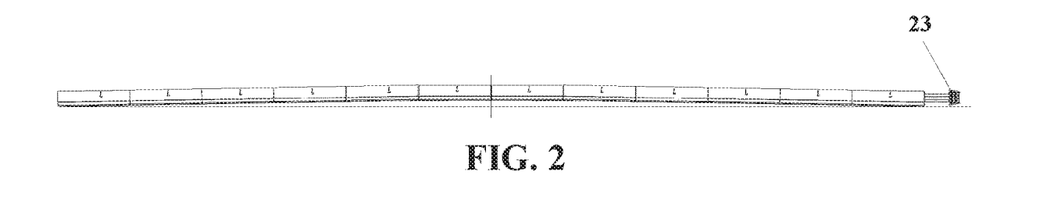
FIG. 2 illustrates a front view of a part structure of the rail vehicle lighting device provided in FIG. 1.
Figure 3:
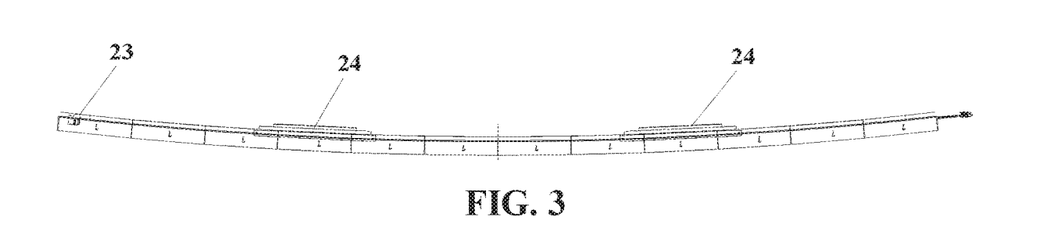
FIG. 3 illustrates a top view of the part structure of the rail vehicle lighting device provided in FIG. 2.
Figure 4:
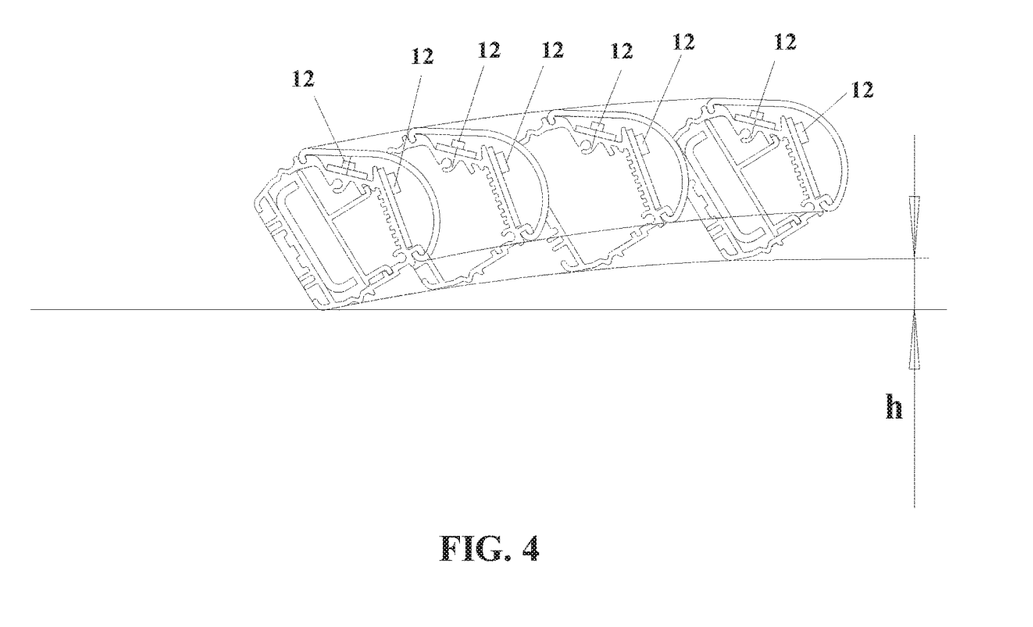
FIG. 4 illustrates a side view of the part structure of the rail vehicle lighting device provided in FIG. 2.
Figure 5:
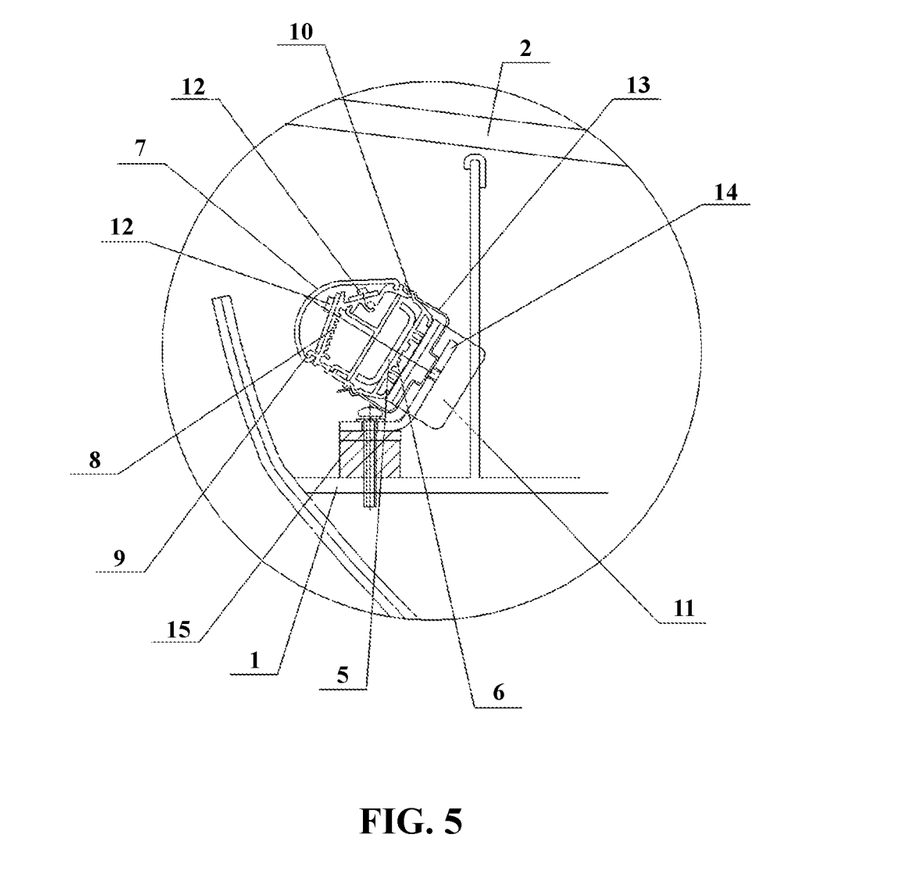
FIG. 5 illustrates a cross-section of the lighting fixture of the present disclosure.

The lamp body 6 is provided with a lampshade buckle 9, a mounting clasp seat buckle 10, a power supply mounting base, and a wiring groove, wherein the lampshade 7 is fastened on the lampshade buckle 9. The power supply 11 is mounted on the power supply mounting base, each of the short lighting fixtures 3 is provided with a wiring groove, and the power supply 11 is fixed with the lamp body, such that the wiring groove, the power supply 11 and the lighting fixtures are integrated together to facilitate assembly. The short lighting fixtures 3 are linked with each other via terminals.

The light source mounting base 8 is provided on the section body 5, two light source mounting bases 8 are provided in the this embodiment, two light sources 12 are mounted on the light source mounting bases 8 respectively, the two light sources 12 have different illumination angles, one light source 12 irradiates toward the top plate of the vehicle body 2, and the other light source 12 irradiates toward the inside of the carriage. Use of two light sources with different illumination ranges not only enables the carriage to have light matching with the interior decoration, but also increases the illumination lightness and enhances the appearance of the carriage.

The light sources 12 in this embodiment are LED light sources. The light source 12 that irradiates toward the top plate of the vehicle body 2 presents the wavy interior decoration 1 through light, achieving a wavy illumination effect; the light source 12 that irradiates toward the inside of the carriage further improves the illumination effect.

Figure 7:
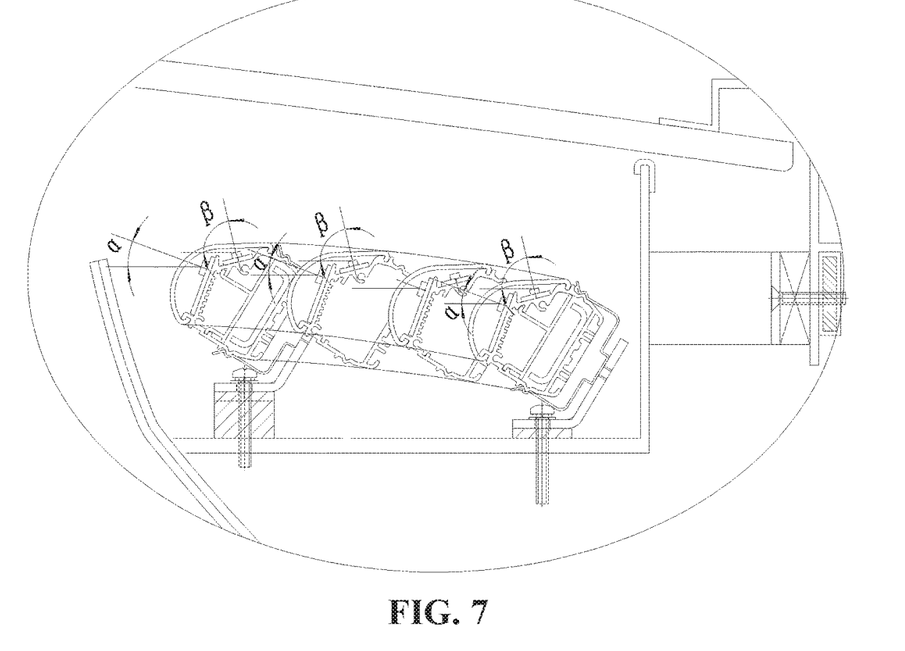
FIG. 7 illustrates included angles between the light sources and a horizontal plane of the present disclosure.

Since the wavy interior decoration 1 has ups and downs in both the horizontal direction and vertical direction, which makes the angles between the two light sources 12 and the horizontal plane different (one angle is a, and the other angle is (3, as shown in FIG. 7). Thereby the section body 5 is twisted and molded based on a calculated angle to form a shape of a twist, such that after the two light sources 12 are paved on the light source mounting bases 8, the angles between each of the light sources 12 or each point of the light sources 12 and the horizontal plane are consistent, that is, the whole strip of the light source 12 has consistent illumination angles. That is to say, the angles between each of the light sources 12 irradiated toward the top plate of the vehicle body 2 and the horizontal plane are consistent (the angles are (3, as shown in FIG. 7); and the angles between each of the other light sources 12 irradiated toward the inside of the carriage and the horizontal plane are consistent (the angles are a, as shown in FIG. 7).

Since included angles between the whole strip of light sources 12 and the horizontal plane are consistent, the light that irradiates on the top plate of the vehicle body 2 can present the shape of the wavy interior decoration 1, satisfying wavy illumination of the interior decoration of the carriage, achieving a mild wavy illumination effect of the top plate of the interior decoration, and further improving the appearance of the carriage.

Each of the short lighting fixtures 3 is fixed with the L-shaped mounting sheet 14 (e.g., bracket) through a mounting clasp seat 13, the L-shaped mounting sheet 14 is fixed with the wavy interior decoration 1, in this embodiment, each of the short lighting fixtures 3 is fastened on the mounting clasp seat 13 via the mounting clasp seat buckle 10 of the lamp body 6, the mounting clasp seat 13 is bolted to one surface of the L-shaped mounting sheet 14, and another surface of the L-shaped mounting sheet 14 is bolted to the wavy interior decoration 1.

The L-shaped mounting sheet 14 and the mounting clasp seat 13 on the L-shaped mounting sheet 14 are fixed on the wavy interior decoration 1 in advance according to the mounting positions, and when the short lighting fixtures 3 is mounted, it is feasible as long as the lamp body 6 is buckled on the mounting clasp seat 13.

Figure 6:
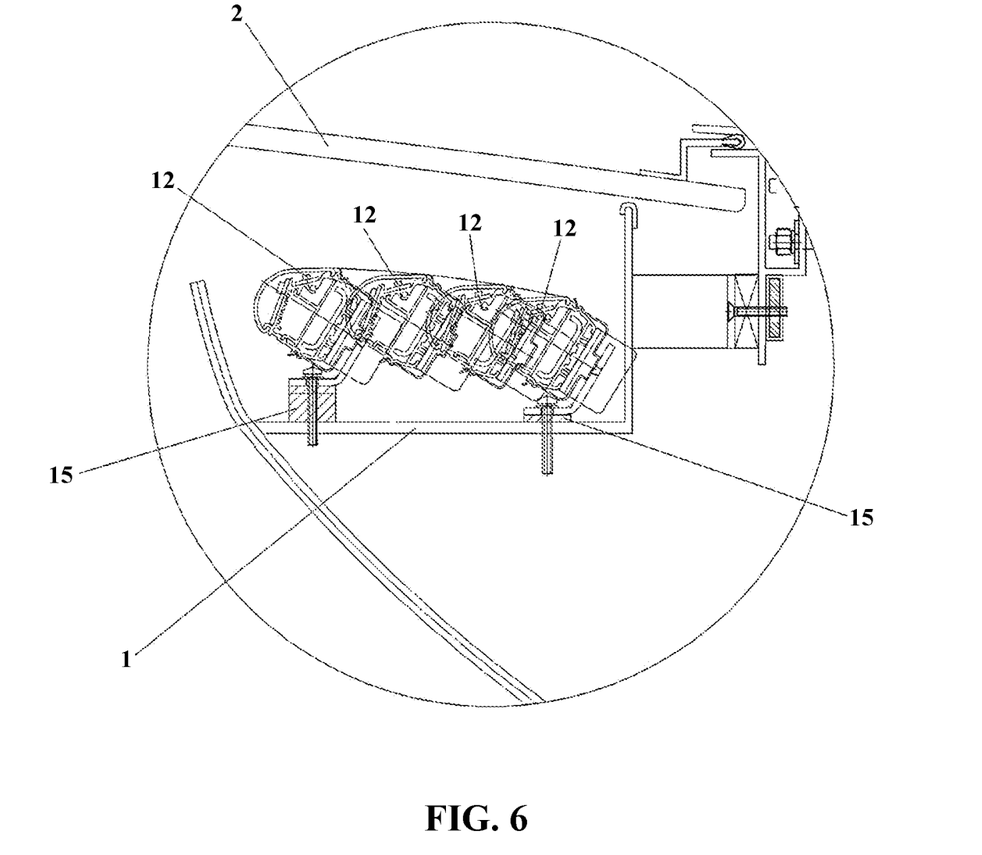
FIG. 6 illustrates cross-sections of the lighting fixtures with different heights of the present disclosure.
Figure 8:
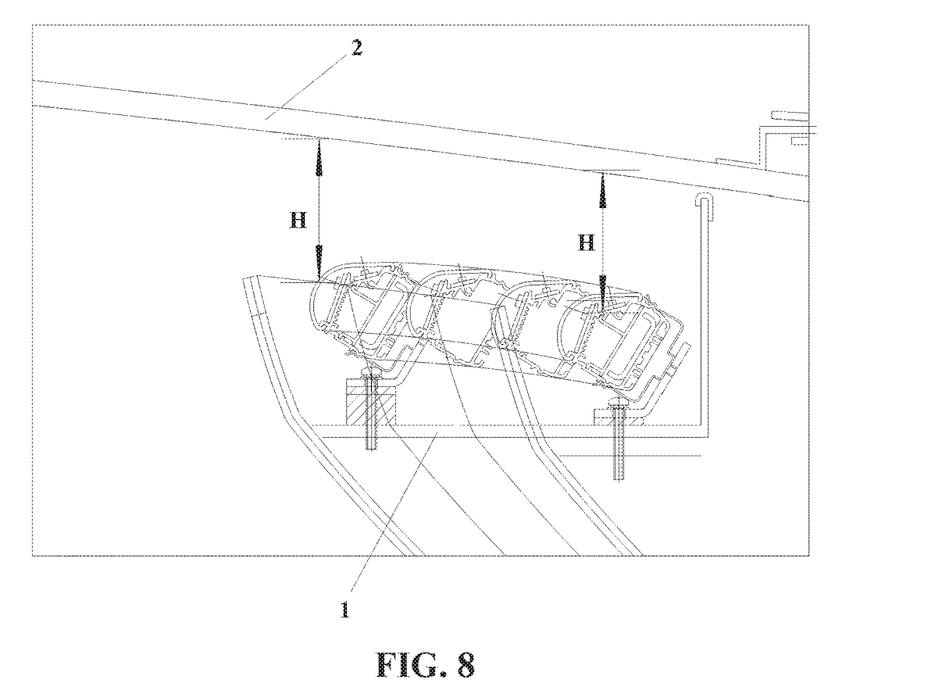
FIG. 8 illustrates distances between the light sources and a top plate of a vehicle body of the present disclosure.

As shown in FIG. 6, since the top plate of the vehicle body 2 is a structure having a higher central portion and lower sides, if the distances between each of the respective light sources 12 with the wavy shapes and the top plate of the vehicle body 2 are different, the illumination effect will become worse, and the light source 12 that irradiates toward the inside of the carriage may produce a shadow to effect the illumination affect. A gasket 15 is provided between the L-shaped mounting sheet 14 and the wavy interior decoration 1, and a thickness of the gasket 15 is adjusted, such that the distances between each of the light sources 12 and the top plate of the vehicle body 2 are the same (as shown in FIG. 8, the distances are H), so as to ensure the illumination effect.

In the rail vehicle lighting device according to this embodiment of the present disclosure, the plurality of short lighting fixtures is assembled into the long lighting fixture having a shape matching with the shape of the irregular interior decoration, not only satisfying a requirement on a shape of a lighting fixture, but also helping with heat dissipation of the lighting fixture. By arranging a twisted section body, respective points of the long lighting fixture have consistent light source illumination angles, thereby achieving a satisfactory illumination effect inside the carriage having an irregular interior decoration, and accordingly improving the appearance of the carriage.

The Second Embodiment

A lighting device according to an embodiment the present disclosure is mainly for illumination of the carriage having an irregular interior decoration, the irregular interior decoration in this embodiment is a wavy interior decoration 1 having ups and downs in both a horizontal direction and vertical direction, and the lighting device according to the present disclosure is provided between the wavy interior decoration 1 and the top plate of the vehicle body 2.

Figure 9:
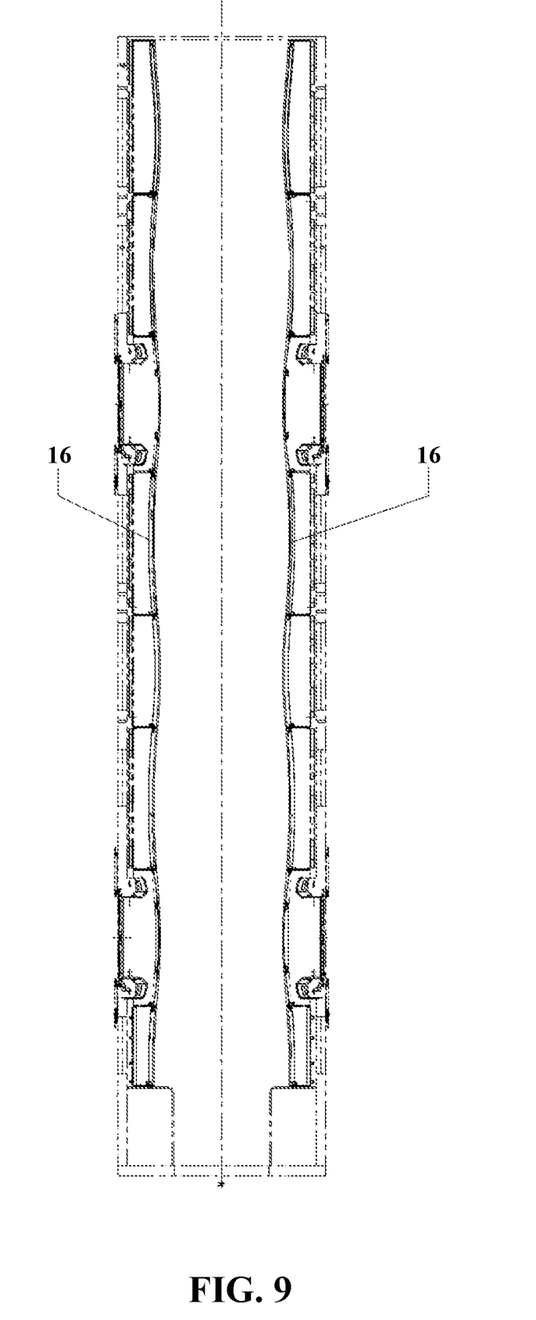
FIG. 9 illustrates a structure of the lighting device provided in another embodiment of the present disclosure.
Figure 10:
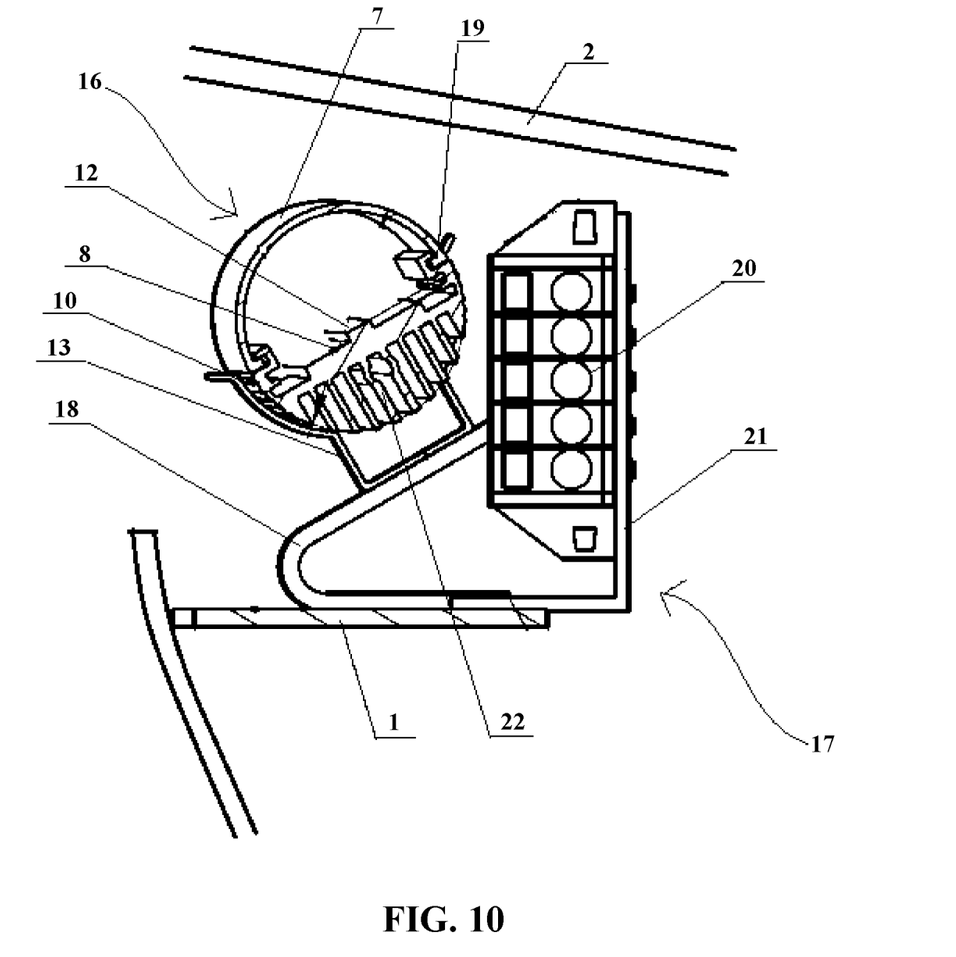
FIG. 10 illustrates a cross section of the lighting fixture provided in FIG. 9.
Figure 11:
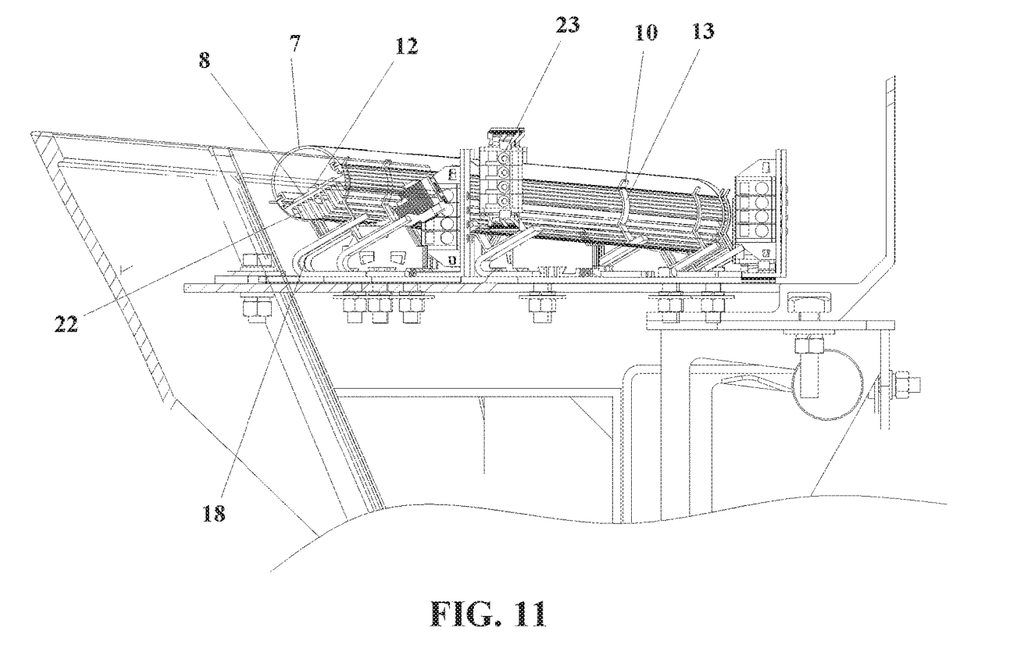
FIG. 11 illustrates a stereogram of the lighting fixture provided in FIG. 9.

As shown in FIGS. 9, 10 and 11, the lighting device includes a lamp tube portion 16 and a lamp body portion 17. The lamp tube portion 16 includes a lamp tube section 22. The lamp tube section 22 is stretched and molded according to the shape of the wavy interior decoration 1 and the lamp tube section 22 after being stretched and molded has a shape matching with the shape of the wavy interior decoration 1. The stretching and molding not only enables the lighting fixture to satisfy the requirement of matching with the wavy interior decoration 1 in shape, but also helps with heat dissipation of the lighting fixture.

The lamp tube portion 16 can also be divided into two sections, and the two sections are assembled into the shape of the wavy interior decoration 1 after each section is stretched and molded.

The cross section of the lamp tube portion 16 is a round shape, the lamp tube section 22 is provided with a light source mounting base 8 and a lampshade mounting base 19, and the lampshade 7 is fixed on the lampshade mounting base 19.

A light source 12 (e.g., a whole strip of LED lights) is mounted on the light source mounting base 8. It irradiates toward the top plate of the vehicle body 2, and presents the wavy interior decoration 1 through light, achieving a wavy illumination effect.

Since the wavy interior decoration 1 has ups and downs in both the horizontal direction and vertical direction, which makes the angles between the light source 12 and the horizontal plane different, the lamp tube section 22 is twisted and molded based on a calculated angle to form a shape of a twist, such that after the light source 12 is placed on the light source mounting base 8, the angles between each of the light source 12 or each point of the light source 12 and the horizontal plane are consistent, that is, the whole strip of the light source 12 has consistent illumination angles. Since included angles between the whole strip of light source 12 and the horizontal plane are consistent, the light that irradiates on the top plate of the vehicle body 2 can present a shape of the wavy interior decoration 1, satisfying wavy illumination of the interior decoration of the carriage, achieving a mild wavy illumination effect of the top plane of the interior decoration, and further improving the appearance of the carriage.

The lamp body portion 17 includes a V-shaped base plate 18, a plurality of mounting clasp seats 13 is fixed on one side surface of the V-shaped base plate 18, and another surface of the V-shaped base plate 18 is fixed with the wavy interior decoration 1.

A top part of the mounting clasp seat 13 is a columnar opening structure, a bottom part of the mounting clasp seat 13 is a U-shaped structure, and an outer surface of the lamp tube section 22 is provided with a mounting clasp seat buckle 10, which can be fixed at an opening structure on the top part of the mounting clasp seat 13.

The lamp tube portion 16 is fixed on the lamp body portion 17 through the mounting clasp seat 13. The lamp body portion 17 is fixed on the wavy interior decoration 1 in advance according to the mounting position, and when the lamp tube portion 16 is mounted, it is feasible as long as the lamp tube portion 16 is buckled on the mounting clasp seat 13.

A plurality of mounting plates 21 is fixed at a side end portion of the V-shaped base plate 18 that is fixed with the wavy interior decoration 1, and each of the mounting plates 21 is provided with a wiring groove 20 and a power supply 24. Both the wiring groove 20 and the power supply are integrated with the lamp body portion 17, so as to facilitate mounting.

Since the top plate of the vehicle body 2 is a structure having a high middle portion and lower sides, if the distances between each of the respective light source 12 with the wavy shape and the top plate of the vehicle body 2 are different, the illumination effect will become worse, a height of the mounting clasp seat 13 is adjusted, such that the distances between each of the light source 12 and the top plate of the vehicle body 2 are the same, so as to ensure the illumination effect.

In the lighting device of embodiments of the present disclosure, the lamp tube section is stretched, twisted and molded into a lighting fixture having a shape the same as the shape of the irregular interior decoration, not only satisfying a requirement on a shape of a lighting fixture, but also helping with heat dissipation of the lighting fixture. By twisting and molding the lamp tube section, respective points of the lighting fixture have consistent light source illumination angles, thereby achieving a satisfactory illumination effect inside a carriage having an irregular interior decoration, and accordingly improving the appearance of the carriage.

As stated above, similar technical solutions can be derived in combination with the contents of the solution given in the specification drawings. However, any modification, equivalent substitution and improvement made within the spirit and principle of the present disclosure are intended to be included within the scope of protection of the present disclosure.

What is claimed is:

1. A rail vehicle lighting device, wherein the rail vehicle lighting device comprises:
    a lighting fixture having a shape matching with a shape of an irregular interior decoration,
    the lighting fixture comprising a plurality of short lighting fixtures that are assembled into a long lighting fixture having a shape matching with the shape of the irregular interior decoration,
    wherein each of the short lighting fixtures is fixed with an L-shaped mounting sheet through a mounting clasp seat, and the L-shaped mounting sheet is fixed with the irregular interior decoration, and
    wherein a gasket is provided between the L-shaped mounting sheet and the irregular interior decoration, and a thickness of the gasket is adjusted, such that distances between light sources of each of the short lighting fixtures and a top plate of a vehicle body are the same.

2. The rail vehicle lighting device of claim 1, wherein each of the short lighting fixtures comprises a section body, a light source on the section body, the lighting fixture comprises a plurality of light sources, and the section body is twisted such that included angles between each of the light sources and a horizontal plane are the same.

3. The rail vehicle lighting device of claim 2, wherein two light sources with different illumination angles are provided on the section body, one light source irradiates toward a top plate of a vehicle body, and the other light source irradiates toward an interior of a carriage.

4. The rail vehicle lighting device of claim 1, wherein the irregular interior decoration has a wavy shape having ups and downs in a horizontal direction and/or a vertical direction.

5. The rail vehicle lighting device of claim 1, wherein each of the short lighting fixtures comprises a housing comprising a lamp body and a lampshade, wherein a section body is provided in the housing.

6. The rail vehicle lighting device of claim 1, wherein each of the short lighting fixtures is provided with a wiring groove.

7. The rail vehicle lighting device of claim 1, wherein each of the plurality of short lighting fixtures and a power supply are fixed and integrated together.

8. The rail vehicle lighting device of claim 1, wherein the plurality of short lighting fixtures are linked with each other via terminals.

9. A rail vehicle lighting device, wherein the lighting device comprises:
   a lighting fixture having a shape matching with a shape of an irregular interior decoration, wherein:
   the lighting fixture comprises a lamp tube portion and a lamp body portion;
   the lamp tube portion comprises a lamp tube section, which, after being stretched and molded, has a shape matching with a shape of the irregular interior decoration;
   a light source is provided on the lamp tube section;
   the lamp tube section is twisted and molded such that included angles between each of the light source and a horizontal plane are the same;
   the lamp tube portion is fixed with the lamp body portion through a mounting clasp seat, and the lamp body portion is fixed with the irregular interior decoration; and
   a height of the mounting clasp seat is adjusted, such that distances between each of the light source and a top plate of a vehicle body are the same.

10. The rail vehicle lighting device of claim 9, wherein the lamp body portion comprises a V-shaped base plate, the mounting clasp seat is fixed on one side surface of the V-shaped base plate, and another side surface of the V-shaped base plate is fixed with the irregular interior decoration.

11. The rail vehicle lighting device of claim 10, wherein a plurality of mounting plates is further provided on the V-shaped base plate, and each of the mounting plates is provided with a wiring groove.

12. The rail vehicle lighting device of claim 11, wherein each of the mounting plates is provided with a power supply.

13. The rail vehicle lighting device of claim 9, wherein the lamp tube section is provided with a light source mounting base and a lampshade mounting base.

14. The rail vehicle lighting device of claim 9, wherein the irregular interior decoration has a wavy shape having ups and downs in a horizontal direction and/or a vertical direction.

* * * * *

UNITED STATES PATENT AND TRADEMARK OFFICE
CERTIFICATE OF CORRECTION

PATENT NO. : 10,822,001 B2
APPLICATION NO. : 16/063151
DATED : November 3, 2020
INVENTOR(S) : Haiyan Zhang et al.

Page 1 of 1

It is certified that error appears in the above-identified patent and that said Letters Patent is hereby corrected as shown below:

In the Specification

| | | |
|---|---|---|
| Column 3, | Lines 62-63, | change "is a, and the other angle is (3," to --is α, and the other angle is β,-- |
| Column 4, | Line 6, | change "are (3, as" to --are β, as-- |
| Column 4, | Line 9, | change "are a, as" to --are α, as-- |

Signed and Sealed this
Twelfth Day of January, 2021

Andrei Iancu
*Director of the United States Patent and Trademark Office*